Feb. 3, 1931.                J. B. GROSS                1,791,447
           FLEXIBLE PIPE CONNECTION WITH SAFETY VALVES
                        Filed April 11, 1928
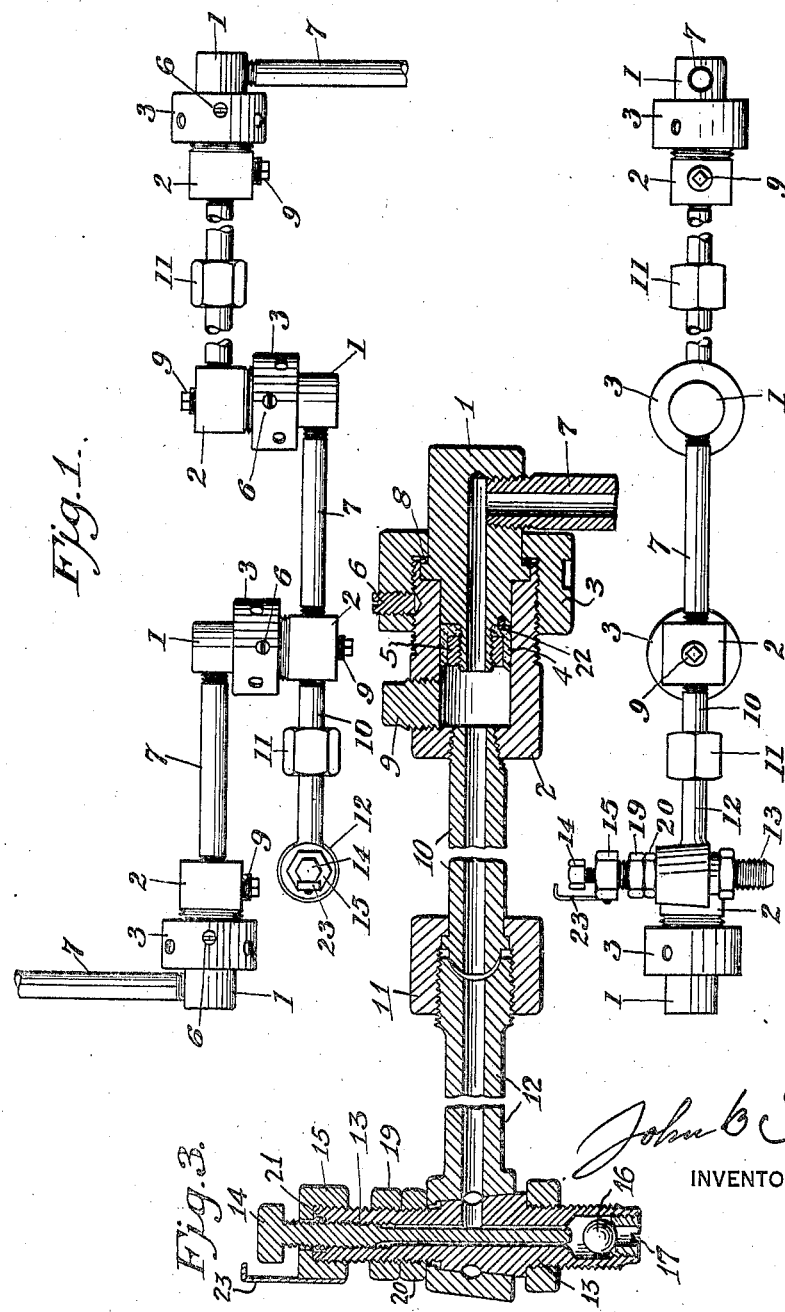
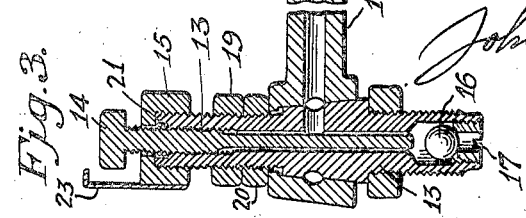
INVENTOR Patented Feb. 3, 1931

1,791,447

UNITED STATES PATENT OFFICE

JOHN B. GROSS, OF BROOKLYN, NEW YORK, ASSIGNOR OF ONE-FOURTH TO JOSEPH W. CONNELLY, ONE-FOURTH TO WILLIAM A. CONNELLY, AND ONE-FOURTH TO ANNA E. CONNELLY, ALL OF JERSEY CITY, NEW JERSEY

FLEXIBLE PIPE CONNECTION WITH SAFETY VALVES

Application filed April 11, 1928. Serial No. 269,291.

The invention relates to swivel pipe connections and has for its object the provision of an improved pipe connection in combination with an uncloggable safety valve, for use in any pipe system transmitting high and low pressures.

These connections are free to revolve in both horizontal and vertical planes, are simple and durable in construction, unbreakable, indestructible, and leak-proof in operation.

The invention consists of certain parts, details and combinations which will be described hereinafter and then be more specifically defined in the claim at the end of the description.

Reference is to be had to the accompanying drawings forming a part of this specification, in which similar characters of reference indicate corresponding parts in all the figures.

Figure 1 is a plan view of several swivel pipe connections and safety valve.

Figure 2 is a front elevation of Figure 1.

Figure 3 is a section of a single swivel pipe connection with safety valve attached, showing details of construction.

Referring now more particularly to the drawings, it will be apparent that there is shown a cylindrical block 1 having connected therewith a pipe 7 which communicates with a bore in said block. A steam-proof and water-proof packing 4 is arranged on a threaded end of block 1, and said packing 4 is pressed tightly against a shoulder formed on the block by a nut 5. The packing 4 is tightly secured in place so that it will revolve with the block 1. The cylindrical block 1 with the packing 4 fits in the boring of fixed block 2. The large shoulder of block 1 fits in a recess in the end of block 2.

Block 1 and block 2 are coupled by a union nut 3 which screws on the threaded open end of block 2 and presses a washer 8 against the shoulder on block 1. Union nut 3 is provided with equally spaced cylindrical grip holes for wrench application and is prevented from turning by a set-screw 6. In a square portion block 2 has tapered tapped holes (Figures 1, 2 and 3) in which pipes and safety valves may be screwed or which may be closed if necessary by plugs 9 when not used.

A safety valve is connected with the block 2 in communication with one of the holes thereof. This safety valve consists of a connecting pipe 10 having a shoulder and semispherical head at one end. The head of pipe 10 is made to fit in a concave recess in the threaded end of valve body 12. Valve body 12 is drilled horizontally to communicate with the opening of pipe 10 and is rigidly connected with pipe 10 by hexagonal union nut 11. The hole and the groove in the conical boring of body 12 communicate with each other.

Tightly fitting into the body 12 is a conical plug 13, shown in Figure 3, having a central bore drilled therein throughout its entire length and threaded on both ends. Plug 13 in its conical portion is provided with a groove in registry with a groove provided in the valve body 12, and said plug also has a hole in communication with its central bore and its groove. Plug 13 is held in the valve body 12 by lock nuts 19 and 20 threaded on its smaller end. The upper end portion of the bore in the plug 13 is tapped to receive a regulating spindle 14 which may be screwed in or out to prevent the closing of a check ball 16, which coacts with a hollow plug 17 in the opposite end of said bore to control the bore in said plug.

When swivel pipe connections, constructed and assembled as described above, are attached to any piping system used for the flow of fluids or gases in the transmission of any and all pressures then the direction of movement of pipe 7 may be changed in either a clockwise or counterclockwise direction without interrupting or disturbing the flow. This movement however, gives direction change in one plane only, hence, if change of flow is desired in planes perpendicular to the one previously mentioned the intermediate swivel pipe connections are made as shown on Figures 1 and 2.

This adaptability of swivel pipe connection for changes of direction in pipe lines is illustrated in Figures 1 and 2. By the use of several swivel pipe connections, the pipe line may take any number of turns in any point producing a perfect flexible line, eliminating entirely possible distortion or breakage.

To prevent at any time possible back flow of liquid or gas caused by disconnection of pipes or any eventual rupture in the pipes during operation, the safety valve is attached to the swivel pipe connections nearest the device to which pressure is being transmitted.

Figures 1 and 2 illustrate a method of connection to one safety valve from two sources of pressure. However, the source of pressure may be reduced to one with one safety valve or it may have two safety valves or more according to the number of devices to which it is necessary and desirous to transmit pressure.

Having thus fully described my invention, I claim as new and desire to secure by Letters Patent:

The combination of a valve having a casing and a plug in said casing, said plug being provided with a passage which extends therethrough, said casing having an inlet which communicates with said passage, means which associates the casing with said plug for rotary movement thereon, said plug being provided with means for fixedly connecting the plug with a suitable conduit with the passage in the plug in communication with the conduit, and a jointed conduit of relatively movable sections connected with the inlet of said casing, whereby the position of the last mentioned conduit may be changed without detaching it from the valve plug or casing.

Signed at Jersey City, in the county of Hudson and State of New Jersey, this 9th day of April, A. D. 1928.

JOHN B. GROSS.